United States Patent [19]
Sawada

[11] Patent Number: 5,826,698
[45] Date of Patent: Oct. 27, 1998

[54] APPARATUS FOR SEPARATING TANGLED COIL SPRINGS

[75] Inventor: Masaaki Sawada, Fuji, Japan

[73] Assignee: Jatco Corporation, Fuji, Japan

[21] Appl. No.: 689,136

[22] Filed: Jul. 30, 1996

[30] Foreign Application Priority Data

Aug. 1, 1995 [JP] Japan ................................. 7-213929

[51] Int. Cl.$^6$ ................................................. B65G 47/12
[52] U.S. Cl. .......................... 198/443; 198/953; 198/391; 198/493
[58] Field of Search ................................. 198/953, 443, 198/391, 493

[56] References Cited

U.S. PATENT DOCUMENTS

| 2,760,679 | 8/1956 | Chadderton et al. | 198/953 |
|---|---|---|---|
| 3,542,185 | 11/1970 | Geyer et al. | 198/953 |
| 3,788,456 | 1/1974 | Ashibe | 198/953 |
| 4,035,029 | 7/1977 | Lindstrom et al. | 198/953 |
| 4,231,687 | 11/1980 | Sticht | 198/953 |
| 4,739,873 | 4/1988 | Yajima | 198/953 |

FOREIGN PATENT DOCUMENTS 5-720  1/1993  Japan .

Primary Examiner—William E. Terrell
Assistant Examiner—Joe Dillon, Jr.
Attorney, Agent, or Firm—Foley & Lardner

[57] ABSTRACT

A spring untangling apparatus for separating tangled coil springs comprises a box having spring inlet and outlet apertures at opposed walls thereof. A spring inlet duct is led to the spring inlet aperture. A vibration device is provided for vibrating the spring inlet duct to cause the tangled coil springs in the inlet duct to move toward the spring inlet aperture. The box is configured so that the tangled coil springs are placed in order so that clusters of the tangled coil springs are led into the box one cluster after another. An air jet nozzle is arranged for forcing the tangled coil springs into the box through the spring inlet aperture with an aid of compressed air, and another air jet nozzle is arranged for blowing up the tangled coil springs in the box to violently hit the same against inner walls of the box thereby untangling the same.

15 Claims, 3 Drawing Sheets

APPARATUS FOR SEPARATING TANGLED COIL SPRINGS

BACKGROUND OF THE INVENTION

1. Field of the Invention

The present invention relates to an apparatus for separating tangled coil springs.

In the following, such apparatus will be called as a spring untangling apparatus for ease of description.

2. Description of the Prior art

In order to clarify the task of the present invention, one conventional spring untangling apparatus will be briefly described, which is disclosed in Japanese Patent First Provisional Publication 5-720.

The conventional apparatus generally comprises a cylindrical basket for containing tangled coil springs therein, a rotary disc rotatably installed in the basket and having a plurality of hitting pins, drive means for driving the rotary disc, a spring outlet duct extending about the basket, a lid put on the basket, and an inclined collision board installed in an upper portion of the basket. When, due to energization of the drive means, the rotary disc is rotated at a given speed, the tangled coil springs in the basket are mixed rigorously and thrown up by the rotating hitting pins. With this, the coil springs are forced to collide against the collision board while being untangled, and the separated coil springs are led into the spring outlet duct and discharged to the outside of the apparatus.

However, due to its inherent construction, such apparatus has failed to exhibit a satisfied performance. In fact, it often occurs that not a small amount of tangled coil springs are left in the spring outlet duct and the basket. That is, in operation of the apparatus, numerous clusters of tangled coil springs are fed into the basket at the same time and they are thrown up simultaneously by the rotating hitting pins. Thus, even when the coil springs are untangled or separated previously, it easily occurs that they become tangled again with neighboring springs during their falling from the collision board.

SUMMARY OF THE INVENTION

It is therefore an object of the present invention to provide a spring untangling apparatus free of the above-mentioned drawbacks.

According to the present invention, there is provided a spring untangling apparatus that assuredly separates tangled coil springs with an aid of compressed air.

According to the present invention, there is provided a structure by which clusters of tangled coil springs are controllably led into the spring untangling apparatus.

According to a first aspect of the present invention, there is provided a spring untangling apparatus for separating tangled coil springs, which comprises a box having at least one collision wall; first means, such as a chute, for conveying the tangled coil springs into the box; second means for placing the tangled coil springs in order so that clusters of the tangled coil springs are controllably led into the box one cluster after another; and third means for hitting each cluster of the tangled coil springs in the box against the collision wall thereby untangling the same.

According to a second aspect of the present invention, there is provided a spring untangling apparatus for separating tangled coil springs, which comprises a box having spring inlet and outlet apertures at opposed walls thereof; a spring inlet duct led to the spring inlet aperture; vibration means for vibrating the spring inlet duct to cause the tangled coil springs in the inlet duct to move toward the spring inlet aperture; means for placing the tangled coil springs in order so that clusters of the tangled coil springs are led into the box one after another; first air jet means for forcing the tangled coil springs into the box through the spring inlet aperture with an aid of compressed air; and second air jet means for blowing up each cluster of the tangled coil springs in the box to violently hit the same against inner walls of the box thereby untangling the same.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
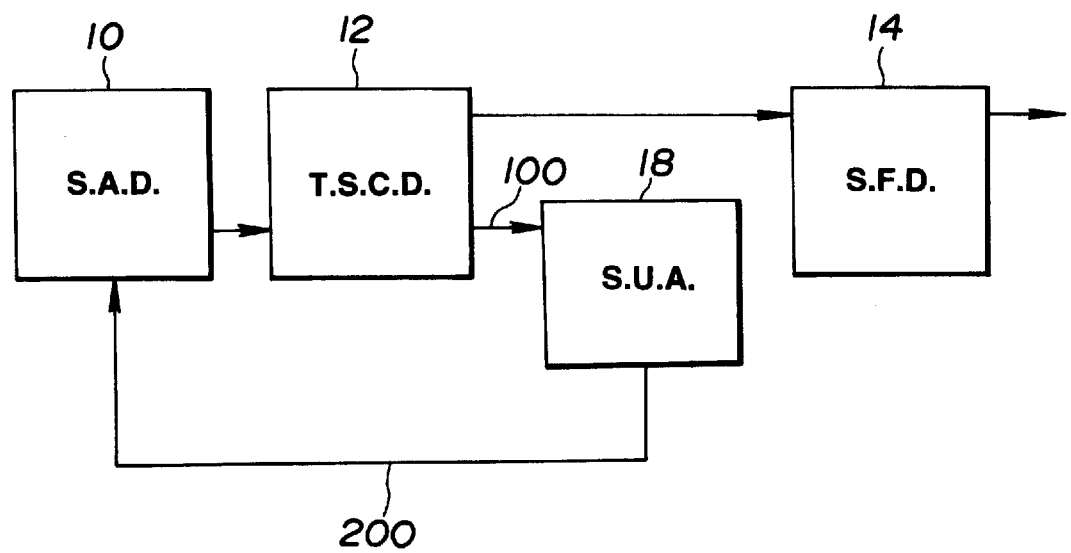
FIG. 1 is a block diagram of a spring feeding line in which a spring untangling apparatus of the present invention is arranged.

Referring to FIG. 1, there is shown a block diagram of a spring feeding line in which a spring untangling apparatus 18 of the present invention is arranged.

The spring feeding line shown comprises a spring aligning device 10 that aligns coil springs supplied thereto, a tangled spring checking device 12 that checks tangled coil springs in the springs fed from the aligning device 10, a spring feeding device 14 to which separated or untangled coil springs are supplied from the tangled spring checking device 12, and a spring untangling apparatus 18 of the present invention, which receives tangled springs from the tangled spring checking device 12 and feeds the springs back to the spring aligning device 10 after untangling the same. The untangled coil springs supplied to the spring feeding device 14 are fed to an assembling machine (not shown).

Figure 2:
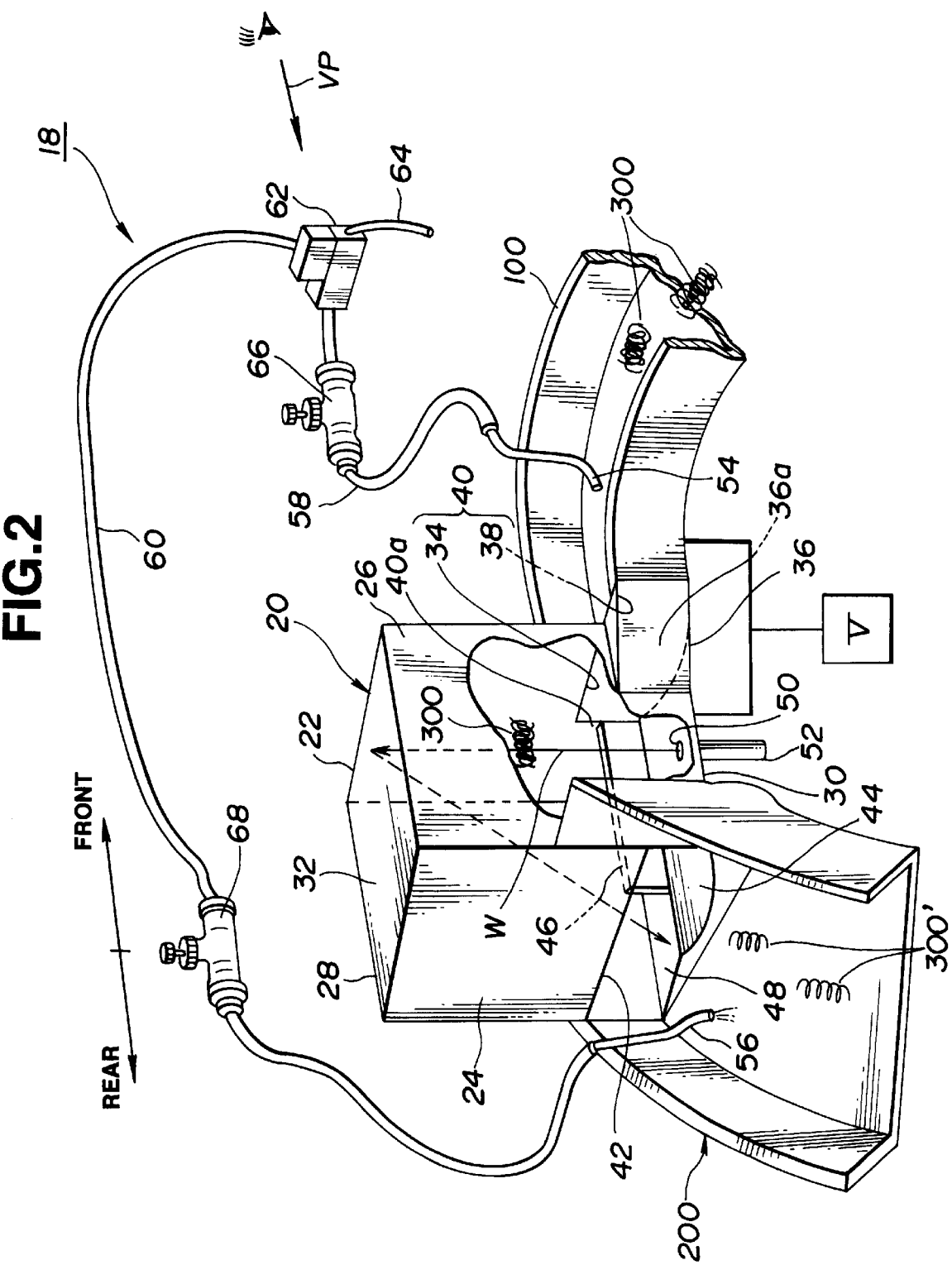
FIG. 2 is a perspective view of the spring untangling apparatus of the present invention.

As is best shown in FIG. 2, the spring untangling apparatus 18 of the present invention comprises a rectangular parallelepiped box 20 arranged between a spring inlet duct 100 and a spring outlet duct 200. As will become apparent as the description proceeds, tangled coil springs 300 from the tangled spring checking device 12 (see FIG. 1) move in the spring inlet duct 100 and enter the box 20, and in the box 20, the coil springs 300 are untangled and then the untangled coil springs 300' in the box 20 are fed back to the spring aligning device 10 (see FIG. 1) through the spring outlet duct 200.

A vibration device "V" is connected to the spring inlet duct 100 and the box 20 to finely vibrate the same. Thus, under operation of the vibration device "V", the tangled coil springs 300 in the inlet duct 100 are moved slowly toward the spring inlet aperture 40. The vibration device "V" is controlled by a controller (not shown) arranged on the spring alignment device 10 and thus, the moving speed of the tangled coil springs 300 in the inlet duct 100 can be controlled by the controller.

The box 20 comprises front and rear walls 22 and 24, left and right walls 26 and 28, and lower and upper walls 30 and 32. If desired, the upper wall 32 may be somewhat inclined.

It is to be noted that the terms "front", "rear", "left", "right" and the like used throughout the specification are to be understood with respect a view point "VP" shown in FIG. 2.

Figure 3:
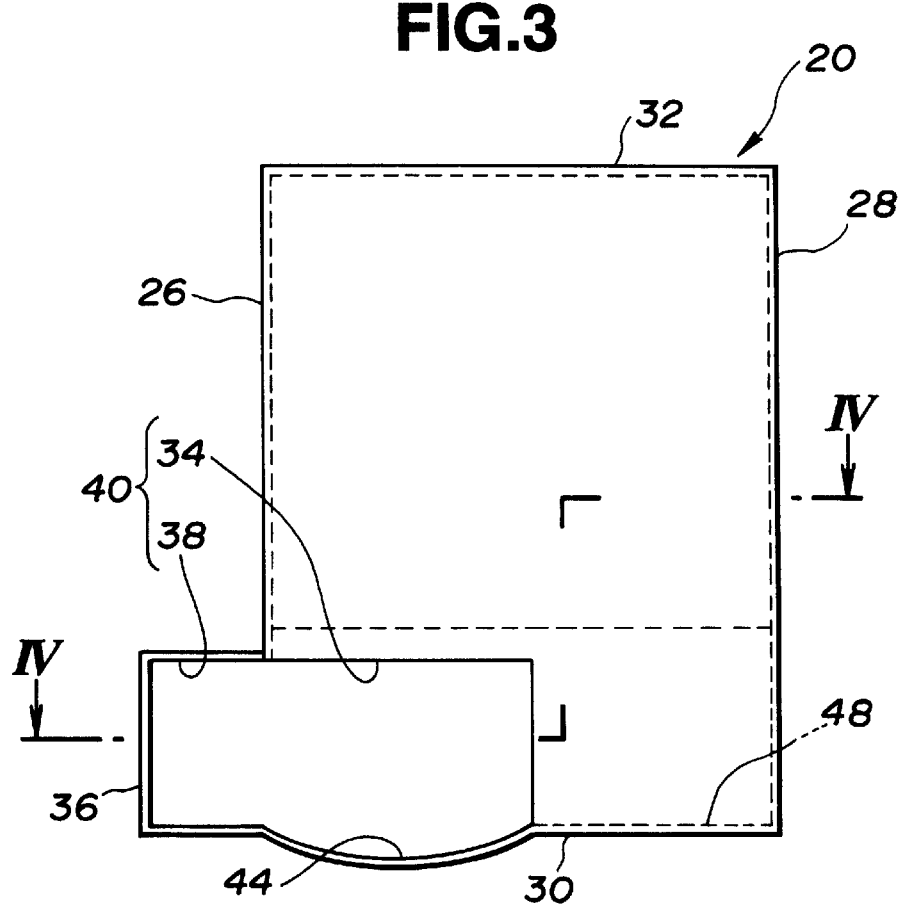
FIG. 3 is a front view of the spring untangling apparatus of the invention.
Figure 4:
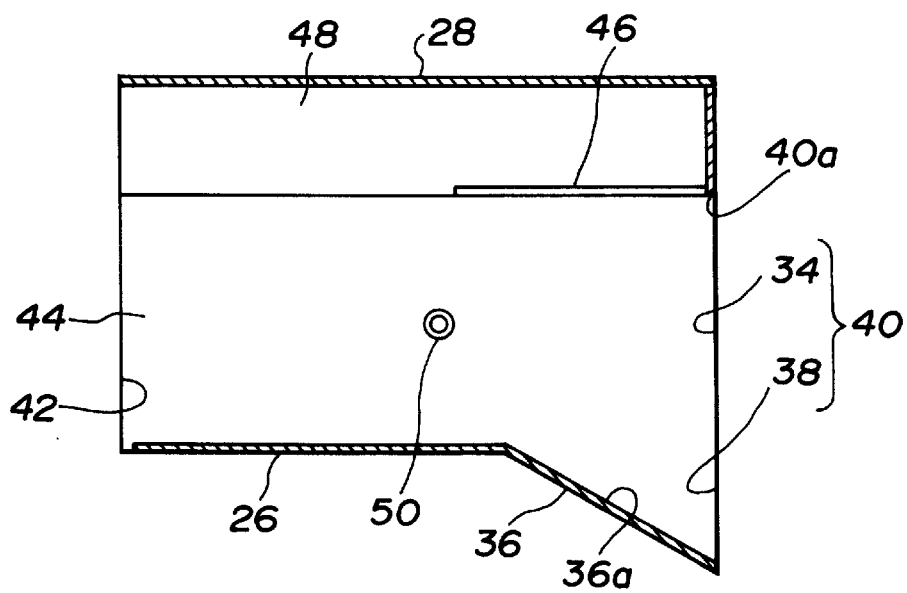
FIG. 4 is a sectional view taken along the line IV—IV of FIG. 3.

As is seen from FIGS. 2, 3 and 4, the front wall 22 of the box 20 is formed at a left and lower part thereof with a rectangular opening 34.

The left wall 26 is formed at its front lower part thereof with a swelled portion 36 that has a rectangular front opening 38 merged with the opening 34. That is, the two rectangular openings 34 and 38 are combined to constitute a laterally elongated rectangular opening 40, which is a spring inlet aperture.

As shown in FIG. 2, the spring inlet aperture 40 is connected to a downstream end of the spring inlet duct 100. Thus, the tangled coil springs 300 from the spring inlet duct 100 are led into the box 20 through the spring inlet aperture 40. During this movement, an angled straight wall 36a defined by the swelled portion 36 serves as a guide for the coil springs 300. That is, due to provision of this angled straight wall 36a, clusters of the tangled coil springs 300 are led into the box 20 in order one cluster after another.

The rear wall 24 is formed at a lower part thereof with a rectangular opening 42, which is a spring outlet aperture.

As is shown in FIG. 2, the spring outlet aperture 42 is connected to an upstream end of the spring outlet duct 200. The untangled coil springs 300' in the box 20 are thus discharged to the spring outlet duct 200 through the spring outlet aperture 42.

The lower wall 30 is formed at a left half thereof with a rounded shallow groove 44, which extends from the spring inlet aperture 40 to the spring outlet aperture 42. More specifically, a front end of the groove 44 constitutes a lower end of the spring inlet aperture 40, while a rear end of the groove 44 constitutes a lower end of the spring outlet aperture 42. That is, the coil springs 300 from the spring inlet aperture 40 travel in and along the rounded shallow groove 44 before reaching the spring outlet duct 200 through the spring outlet aperture 42. That is, this groove 44 promotes the spring placing function of the above-mentioned angled straight wall 36a. Preferably, the groove 44 is sloped down toward the outlet aperture 42.

A spring guide ridge 46 is formed on the lower wall 30, which extends along a right bank of the groove 44 from a right side 40a of the spring inlet aperture 40 to a position near the spring outlet aperture 42. Due to provision of the spring guide ridge 46, there is defined a spring collecting space 48 at a right position of the ridge 46 in the box 20.

The groove 44 of the lower wall 30 is formed at a deepest portion thereof with an air jet opening 50 to which a pipe 52 is connected from the outside, as shown. Although not shown in the drawing, the pipe 52 is connected to a compressed air source through a valve. Thus, when the valve assumes "OPEN" position, compressed air is injected into the box 20 from the air jet opening 50, as is indicated by an arrow illustrated by a broken line "W".

First and second air nozzles 54 and 56 are arranged over the spring inlet and outlet ducts 100 and 200 respectively. As shown, the first air nozzle 54 has an air jet opening directed toward the spring inlet aperture 40 of the box 20, while the second air nozzle 56 has an air jet opening directed toward the downstream portion of the outlet duct 200.

These two air nozzles 54 and 56 are connected through respective tubes 58 and 60 to a solenoid valve 62 to which an air feeding tube 64 extending from the compressed air source (not shown) is connected. The tubes 58 and 60 have respective pressure adjusting valves 66 and 68 mounted thereto. The solenoid valve 62 is set to assume "OPEN" position when the spring aligning device 10 is operated. The pressure adjusting valves 66 and 68 adjust the pressure of compressed air injected from the nozzles 54 and 56.

In the following, operation of the spring untangling apparatus 18 of the invention will be described with reference to FIGS. 1 and 2.

For ease of understanding, description of the operation will be made with respect to a condition where the spring feeding line is under operation.

During operation of the spring feeding line, clusters of tangled coil springs 300 checked by the tangled spring checking device 12 are dropped into the spring inlet duct 100 and carried toward the box 20 due to the vibration motion applied to the inlet duct 100 by the vibration device "V".

When coming to a position near the spring inlet aperture 40 of the box 20, the clusters of tangled coil springs 300 are forced into the box 20 through the aperture 40 due to a force of compressed air injected from the first air nozzle 54. When passing through the aperture 40, the clusters of tangled coil springs 300 are forced to make a line due to provision of the angled straight wall 36a. Thus, the clusters of the tangled coil springs 300 are led into the box 20 one after another and move in and along the rounded shallow groove 44. When now coming to the position of the air jet opening 50, the clusters of tangled coil springs 300 are violently blown up one after another by a compressed air "W" injected from the air jet opening 50. The blown up clusters of coil springs 300 are violently hit against the upper wall 32 and then against some of the side walls 22, 24, 26 and 28 of the box 20 and finally drop into the spring collecting space 48 in the box 20. During this, the coil springs 300 of each cluster are untangled or separated and then drop to the spring outlet duct 200 through the spring outlet aperture 42. Due to a compressed air injected from the second air nozzle 56, discharging of the untangled springs 300' from the box 20 is smoothly carried out.

The separated springs 300' thus led to the outlet duct 200 are carried back to the spring aligning device 10 to be aligned again.

As is described hereinabove, according to the spring untangling apparatus of the invention, the tangled coil springs 300 can be assuredly separated due to the unique structure of the apparatus.

What is claimed is:

1. A spring untangling apparatus for separating tangled coil springs, comprising:

a box having at least one collision wall;

first means for conveying the tangled coil springs into said box;

second means for controllably introducing the tangled coil springs in order into said box; and third means for hitting each cluster of the coil springs in the box against said collision wall to thereby untangle the same, wherein said second means comprises:

a groove formed in a lower wall of said box, said groove extending in a direction from an inlet side of said box to an outlet side of said box, said groove being configured to align clusters of the tangled coil springs; and means for vibrating said lower wall of the box to convey said coil springs; and wherein said third means comprises at least one air jet nozzle from which a compressed air is injected into the box, said air jet nozzle being provided in said groove.

2. A spring untangling apparatus as claimed in claim 1, wherein said groove is rounded.

3. A spring untangling apparatus as claimed in claim 1, wherein said groove is sloped down toward the outlet side of the box.

4. A spring untangling apparatus as claimed in claim 1, wherein said second means further comprises:

a narrowing portion provided on said groove at position upstream of said air jet nozzle.

5. A spring untangling apparatus as claimed in claim 4, wherein said narrowed portion is defined by an inlet aperture formed in a wall of said box through which the tangled coil springs are led into the box.

6. A spring untangling apparatus as claimed in claim 1, wherein said lower wall of said box is formed with a spring guide ridge for guiding the coil springs during movement thereof in the box and defining a spring collecting space in said box.

7. A spring untangling apparatus as claimed in claim 6, wherein said spring collecting space is communicated with a spring outlet duct, which extends from a spring outlet aperture formed in a rear wall of said box.

8. A spring untangling apparatus as claimed in claim 6, wherein said groove extends between said spring inlet and outlet sides.

9. A spring untangling apparatus as claimed in claim 1, further including:

a first air jet nozzle positioned to propel the tangled springs into said box.

10. A spring untangling apparatus as claimed in claim 9, further including:

a second air jet nozzle positioned to propel untangled springs out from said box.

11. A spring untangling apparatus for separating tangled coil springs, comprising:

a structure having a lower wall, a collision wall vertically spaced from the lower wall, an inlet wall extending from one side of the lower wall and having an inlet opening, and an outlet wall extending from a side opposite the one side of the lower wall and having an outlet opening, the lower wall having a groove extending in a direction between the inlet wall and the outlet wall and being configured to align clusters of the tangled coil springs introduced into the inlet opening;

a guide associated with the inlet opening for controllably introducing the tangled coil springs into the structure;

a vibratory device for vibrating at least the lower wall to advance the coil springs into the inlet opening; and a first air jet nozzle positioned in the groove, wherein an air jet exiting the nozzle is adapted to propel the coil spring upwardly and collide each tangled clustered coil springs against the collision wall to untangle them.

12. A spring untangling apparatus according to claim 11, wherein the structure has a side wall with an angled straight wall forming said guide that extends from the inlet opening toward the air jet nozzle.

13. A spring untangling apparatus according to claim 12, further including a spring guide ridge extending uprightly from the lower wall to guide the springs into the groove.

14. A spring untangling apparatus according to claim 11, further including:

an inlet chute positioned adjacently to the inlet opening for conveying the tangled coil springs into the structure;

an outlet chute positioned adjacently to the outlet opening for conveying the coil springs out of the structure.

15. A spring untangling apparatus according to claim 14, further including:

a second air jet nozzle positioned near the inlet opening to propel the tangled springs into the structure; and a third air jet nozzle positioned near the outlet opening to propel the untangled springs away from the structure.

* * * * *